April 21, 1953     O. W. BROWN     2,636,105
WELDING APPARATUS FOR PLOW SHARES
Filed Jan. 14, 1950     3 Sheets-Sheet 1

INVENTOR.
ORWELL W. BROWN
BY
ATTORNEY

April 21, 1953  O. W. BROWN  2,636,105
WELDING APPARATUS FOR PLOW SHARES
Filed Jan. 14, 1950  3 Sheets-Sheet 2

INVENTOR.
ORWELL W. BROWN
BY  A.S. Knoth
ATTORNEY

April 21, 1953     O. W. BROWN     2,636,105
WELDING APPARATUS FOR PLOW SHARES
Filed Jan. 14, 1950     3 Sheets-Sheet 3
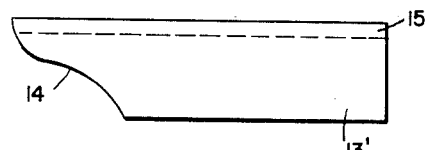 
FIG. 5     FIG. 6
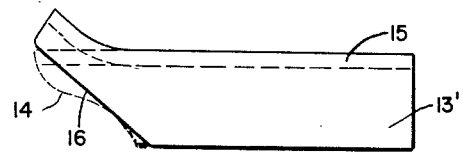
FIG. 7
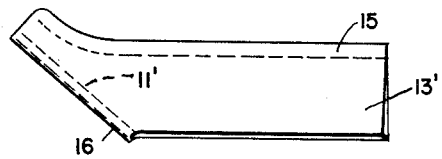
FIG. 8
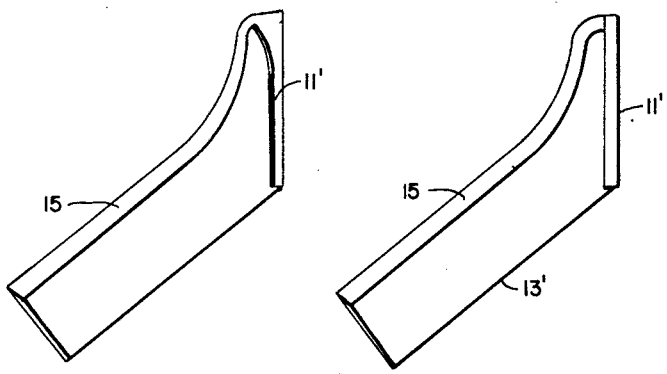 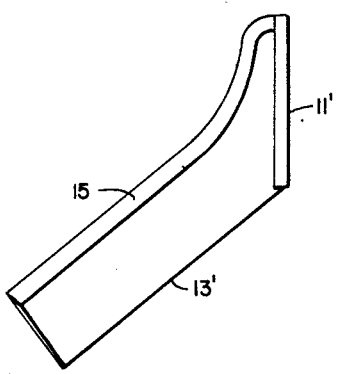
FIG. 10     FIG. 9
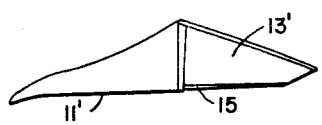
FIG. 11
INVENTOR.
ORWELL W. BROWN
BY
ATTORNEY Patented Apr. 21, 1953

2,636,105

UNITED STATES PATENT OFFICE 2,636,105

WELDING APPARATUS FOR PLOWSHARES

Orwell W. Brown, Port Credit, Ontario, Canada, assignor to Massey-Harris Co. Ltd., Toronto, Canada, a corporation of Canada Application January 14, 1950, Serial No. 138,670

1 Claim. (Cl. 219—17)

My invention relates to a primary method of forming the two share parts from flat stock, then arc welding these parts together by preferably the submerged system, then completing the shape of the share by die forging, thereby to produce a better, stronger and more uniform share at lower cost than by well known methods.

An important object of the present invention is to arc weld specially shaped share parts together using a novel holding jig, in a manner whereby the submerged welding system may be used to thereby insure a more perfect joint between the parts welded together.

To these and other useful ends, my invention consists of parts, combinations of parts or their equivalents as hereinafter described and claimed and shown in the accompanying drawings in which:

Fig. 5 illustrates a share plate 13' after the cutting edge has been formed.

Fig. 6 is an end view of the share plate as shown in Figure 5.

Fig. 7 illustrates the share plate after being horned in a special die to the shape shown by full lines.

Fig. 8 illustrates a top view of the share plate after the landside has been electrically welded to the plate, the landside being shown by a dotted line.

Fig. 9 is a bottom view of the share after the landside has been welded thereto.

Fig. 10 is a bottom view of the share after it has been drop forged into shape.

Fig. 11 is a three quarter rear view of the share after it has been drop forged into shape.

It will be understood that the shares when completed are in the rough and before they have been ground, polished or machine surfaced.

Figure 4:
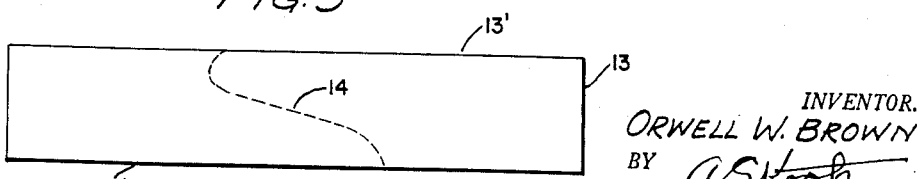
Fig. 4 illustrates a sheet of metal 13 from which two share plates are made by severing the parts as illustrated by dotted line 14.

Referring now specifically to Figures 3 through 7; a suitably sized bar 11 is severed as at 12 into double curved shapes forming two landside plates 11'—11'. Figure 4 illustrates a suitably sized plate of steel 13 which is severed as at 14 forming two share plates 13'—13'. Share plate 13' is first heated on its forward edge and then sharpened as at 15, after which this member is heated on its forward end and horned into the shape shown in Figure 7, leaving the plate flat and former edge 14 straight as at 16.

The straight long side of landside 11' is then held against share plate 13' on the under side thereof and near the straight side 16 of this member and at an acute angle, by means of a special jig holding device, as will hereinafter appear.

The long straight edge of member 11' is preferably at right angle to the sides of this member so that a narrow V-shaped trench is formed for the reception of the welding spelter and for providing a welding zone between members 11' and 13'. This long straight edge of member 11' may be slightly angled so as to reduce the width of the V-shaped trench or this surface may be angled so there is no trench at all provided.

Figures 8 and 9 illustrate the share assembly after member 11' has been arc welded to member 13'. In Figures 8 and 9 the share plates are still flat and the landsides are positioned vertically. Figure 10 is a bottom view of the share after the assembly has been forged to shape. In this operation, the bottom surface of the landside is made straight for the major part of its length as illustrated in Figure 11. The forward end of the landside and share plate is shaped as illustrated in Figure 11.

Referring again to Figures 9, 10 and 11; Figure 9 is a bottom view of the share with the landside 11' in a vertical position. Figure 10 illustrates the share in the same position as in Figure 9 except after it has been drop forged to its final shape as illustrated in Figure 11 in which figure the outer side of the landside is also positioned vertically, with the heel and point of the landside substantially on a horizontal plane with the wing of the share, or similar to the position assumed by the share when the plow is in an operating position.

From the next above description, it will be seen that the landside is welded to the share plate while the share plate is flat after which the share is drop forged into shape as shown in Figures 10 and 11, the principal operation being first to shape the share plate and landside as illustrated in Figures 3, 4, 5, 6 and 7; next to weld the landside to the share plate and next to drop forge the share into its final shape as shown in Figure 11 making it ready for trimming, submerged tempering and polishing.

My novel holding jigs are in their entireties, designated by reference character A. The electric welding head is in its entirety, designated by reference character B.

Figure 1:
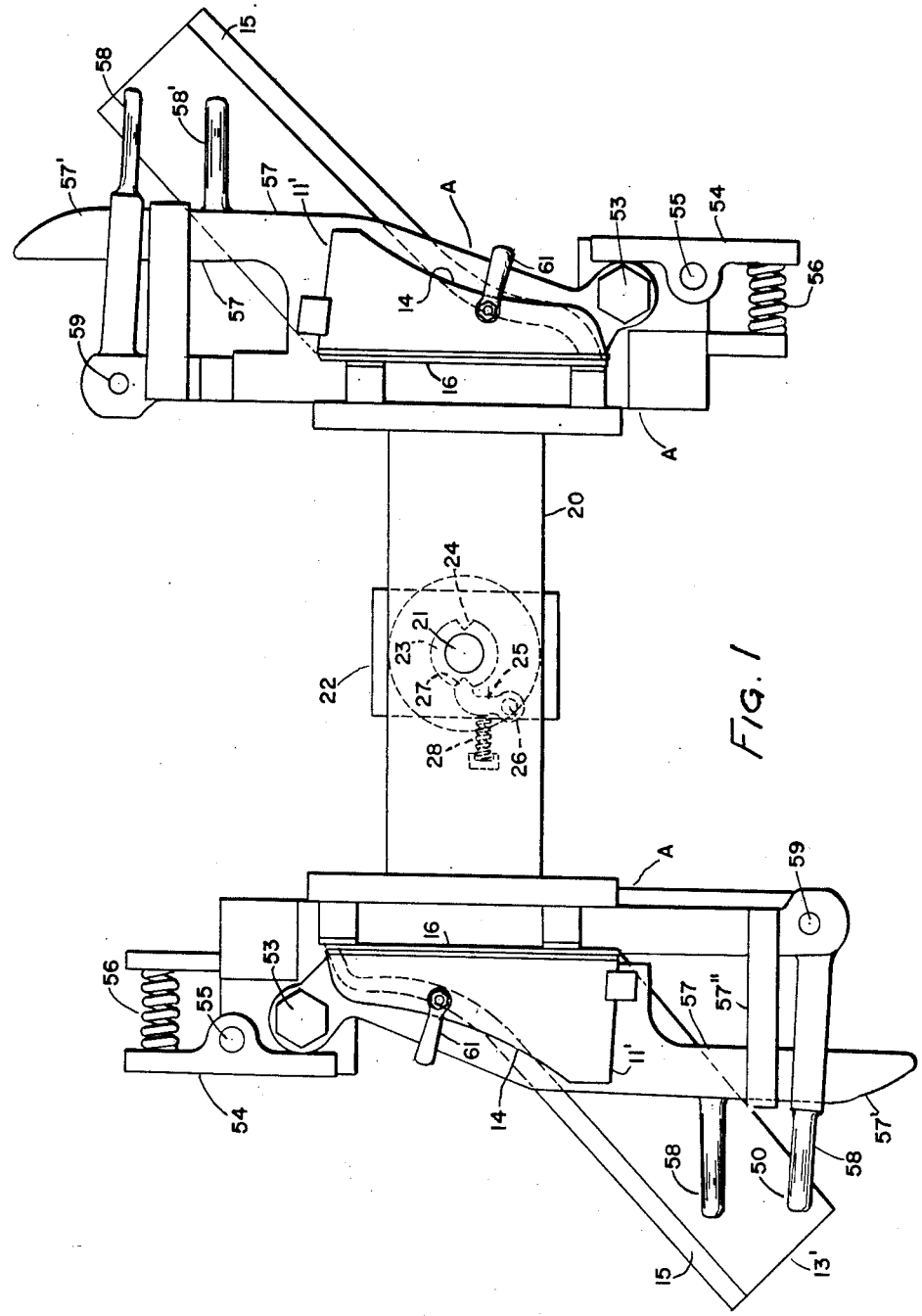
Fig. 1 is a top view of my novel holding fixture.

I preferably secure members A to opposite ends of a main frame 20, thus forming a complete fixture (see Figure 1), member 20 being rotatably mounted on a pivot 21 positioned midway of members A, the pivot being mounted on a base or pedestal 22.

I provide means on members 20 and 22 for holding members A in their operating positions comprising preferably a hub 23 secured to member 20 having on opposite sides thereof V-shaped grooves 24—24, these grooves being in longitudinal alignment with member 20. I provide a dog 25 and hingedly mount this dog on a pin 26 which is secured to base 22, the free end of dog 25 being provided with preferably a V-shaped projection 27 adapted to mesh into grooves 24. A push spring 28 is adapted to yieldingly force member 27 into grooves 24. Thus it will be seen that a definite position for members A is provided for accommodating the position of the welder head B, so the welding rod can be moved over the joint between the share parts starting preferably at the point as shown in Figure 2.

I will now describe my novel means for jigging and welding the landside to the share plate. This means is adapted to be served by two operators, one operator places the two share parts in the holding jig A in the position shown in Figure 2, and the jig is then moved under the welding head and the share parts welded together by the other operator while a jig is emptied and again loaded; thus the output capacity is very large and the cost per share is reduced to a minimum.

Figure 2:
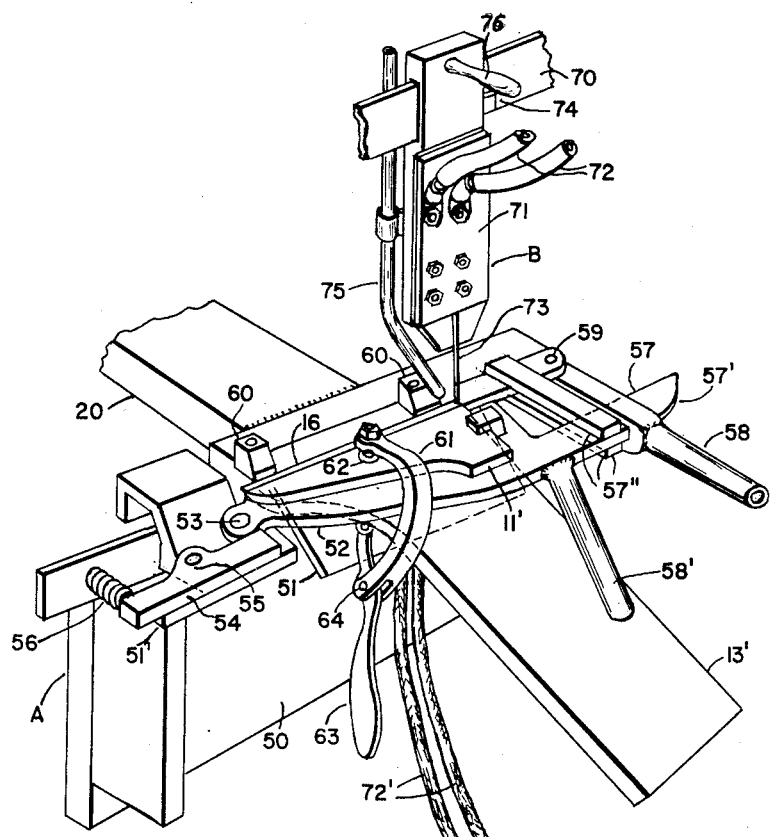
Fig. 2 is an enlarged perspective view of one of the share holding jigs showing a share in position for the welding operation, and illustrating the welding rod, its holder and flux tube, in position for the beginning of a submerged welding operation.
Figure 3:
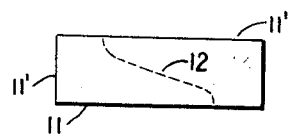
Fig. 3 illustrates a plate of steel 11 from which two landsides are made by severing the part as illustrated by dotted line 12.

A complete jig A used for the welding operation is clearly illustrated in Figure 2. This is the preferred form and comprises a base plate 50 secured to the ends of member 20 having a flat member 51 secured thereto on which share plate 13' rests and a flat horizontal plate 51' is suitably secured to base plate 50. A positioning member 52 is provided on which share landside 11' rests with the long side in contact with the front end of share plate 13'. Positioning member 52 is pivotally mounted on one end as at 53 contacting a bar 54 which rests on plate 51' and is pivoted near its center to this plate as at 55 and near the longitudinal center thereof. A push spring 56 is adapted to rest against the left end of bar 54, thus to urge the pivoted end of positioning member 52 toward base plate 50. An extension member 57 is provided on the free end of positioning member 52 having a cam shaped surface 57'. A lever 58 is indirectly pivoted to base plate member 50 as at 59 and is adapted to embrace extension member 57 and contact cam surface 57' of this member when the lever is in the position shown.

Thus member 58 and bar 54 will act to press share landside 11' against the undersurface of share plate 13'. Member 11' is suitably secured to positioning member 52 by means of a U-shaped clamp 61 having contact with member 11' as at 62. A lever 63 is pivoted to the lower end of member 61 as at 64, its upper end being adapted to contact the lower side of positioning member 52. After the weld is made, lever 58 may be moved to the right so as to disengage member 57 and the free end of member 57 may then be swung to the left by means of a lever 58' and clamp 61 disengaged so the welded share may be removed.

I provide two arms 57''—57'' which are rigidly secured indirectly at their inner ends to plate 50. These arms slidably contact opposite sides of member 57, thus to firmly hold the free end of member 52 in an operating position.

I provide two stops 60—60 preferably made from copper against which surface 16 is pressed endwise. Another stop (not shown) is provided against which the rear edge of member 13' is pressed, thus to definitely position member 13' for the welding operation.

Member B is slidably mounted on guide member 70 which is positioned parallel to the surfaces to be welded together. On the lower end of member B I insulatingly mount a welding holding bracket 71 which is connected to the low voltage, high amperage welding transformer by means of two cables 72—72. In any suitable manner I mount a welding rod 73 on guide member 71. Member 70 is provided with a limit stop 74 adapted to hold welding rod 73 in the position shown or in position for the beginning of the welding operation.

A suitable flux powder supply is provided to which a tube 75 is connected, this tube being secured to member B so its outlet end is adjacent welding rod 73 and directly above the joint to be welded. When the operator desires to make a weld, a quantity of powdered flux is permitted to flow against welding rod 73 and in and over the V-shaped opening between members 11' and 13'. An arc is established and member B is moved across the joint to be welded.

A handle 76 is provided for the convenience of the operator in moving welding head B back and forth. The flow of flux and of electric current is stopped when the weld is completed. Member B is then returned to the starting point and the next share is swung into position by turning the freshly loaded jig in position for the weld, and the welding operation performed while the welded share is being removed and fresh parts loaded into the holding jig by the other operator.

It will be understood that suitable means are provided for conveniently raising and lowering the welding rod and head B in order to assist the operator in making the weld. Convenient means are provided for controlling the flow of spelter and welding current, is not being thought necessary to illustrate or describe this means.

It will be understood that member 20 will be moved on its pivot one half turn back and forth instead of moving this member a full circle, this being done in order to provide convenient means for connecting the ground cables 72'—72' to the transformer to which members 72 are also directly connected. Members 72' are preferably connected to member 51 near the upper end thereof for obvious reasons.

Clearly many minor detail changes may be made in my improved means for holding the share parts while they are being arc welded without departing from the spirit and scope of my invention as recited in the appended claim.

Having thus shown and described my invention, I claim:

In an apparatus for welding plow shares; a base member; a main frame rotatably mounted on said base member; locking means for securing said main frame to said base member in either of at least two positions; a holding jig secured to either end of said main frame comprising, a flat member for holding one of the pieces to be welded, a positioning member pivotably mounted at one end and adapted to be swung between operative and inoperative positions, means for securing the other end while in the operative position, and clamping means to secure another piece to be welded to said positioning member.

ORWELL W. BROWN.

References Cited in the file of this patent

UNITED STATES PATENTS

| Number | Name | Date |
| --- | --- | --- |
| 258,938 | McKinniss | June 6, 1882 |
| 775,424 | Jarmin | Nov. 22, 1904 |
| 2,153,785 | Williams | Apr. 11, 1939 |
| 2,262,885 | Condo | Nov. 18, 1941 |
| 2,467,311 | Hudson | Apr. 12, 1949 |